UNITED STATES PATENT OFFICE.

JOHN H. STEVENS, OF NEWARK, NEW JERSEY, ASSIGNOR TO THE CELLULOID COMPANY, OF SAME PLACE.

MANUFACTURE OF SOLID OR MASSIVE COMPOUND OF PYROXYLINE.

SPECIFICATION forming part of Letters Patent No. 542,692, dated July 16, 1895.

Original application filed June 9, 1890, Serial No. 354,785. Divided and this application filed December 21, 1893. Serial No. 494,298. (No specimens.)

*To all whom it may concern:*

Be it known that I, JOHN H. STEVENS, of the city of Newark, county of Essex, and State of New Jersey, have invented certain new and useful Improvements in the Manufacture of Solid or Massive Compounds of Pyroxyline, of which improvements the following is a specification.

This invention relates to the manufacture or manipulation of those varieties of material designated as "solid" or "massive" compounds of pyroxyline, or those compounds in which the process of conversion is effected while the material is in the solid or massive condition, which, as is well known, have already been the subject of extensive investigation and numerous patents; and it has for its object the production of a new composition of matter by bringing together into new relations and with novel effects certain substances well known to chemistry, as hereinafter described.

The present application is a division of my original application filed June 9, 1890, Serial No. 354,785.

The distinctive novelty of this improvement in the art or manufacture consists in mixing pyroxyline, champhor, and the solid substance known as "dinitro-toluol," and in such a manner that the presence of the dinitro-toluol gives the property of plasticity to the compound and renders it susceptible of conversion into an amorphous condition, or permits its manipulation or change of shape by the ordinary means employed in connection with other solid pyroxyline compounds, and in addition furnishes a compound possessing entirely new and unique properties.

My invention is based upon the fact that dinitro-toluol in the presence of camphor, when melted by heat, is an active solvent of pyroxyline, and that a suitable combination of dinitro-toluol, camphor, and soluble pyroxyline is more plastic or more susceptible to the influence of heat and pressure than the camphor-pyroxyline compounds, or dinitrotoluol-pyroxyline compounds separately, the discovery of which facts I believe to be entirely original with me.

As to the character of the soluble pyroxyline employed, the state of the art, the nature of pyroxyline compounds, and the difficulties connected with the discovery and application of solvents of pyroxyline, I refer to my original application of June 9, 1890, hereinbefore mentioned, or to its references.

By means of the present invention I am enabled to produce not only a new composition of matter having peculiar characteristics and different from any of the compounds heretofore known, as hereinafter described; but these characteristics could not have been predicted without trial and simply from a knowledge of the nature of the pyroxyline and the solvent power of dinitro-toluol or camphor separately. This arises largely from the fact that a mixture of equal parts of dinitro-toluol and camphor, when combined with pyroxyline, furnishes a compound which molds, flows, or is plastic at a much lower temperature than the same compound made by substituting either camphor or dinitro-toluol for the mixture of the two. Of course, as camphor varies in its purity and the dinitrotoluol differs as to its melting-point in different varieties or samples, the same particular qualities or kinds must be taken for purposes of comparison.

In combining dinitro-toluol in the presence of camphor with pyroxyline I make use of the processes usually employed when camphor alone is the solid solvent: and the results, to some extent, are similar, for the dinitro-toluol remains a part of the finished compound and imparts to it the susceptibility of being readily molded under heat and pressure. There are, however, the following important differences: The high temperature at which camphor melts limits its practical employment as a solvent alone or uncombined with a trace of alcohol or its equivalent, for the use of great heat injures these compounds by its tendency to decompose the pyroxyline, or at least to discolor it; but, as before stated, the addition of dinitro-toluol to the camphor reduces the melting-point of the camphor, and the solvent action of the dinitro-toluol and comphor is effected at a much lower temperature than if camphor were used alone.

The usual practice has been to employ alcohol or some similar solvent in connection with the camphor to lower its melting-point, so that the compound could be manipulated at comparatively low temperatures in rolls, and the molding-operation on the seasoned product be conducted at lower temperatures than are possible when camphor alone is the solvent. The effect of this has been to render the seasoning and molding of these compounds very delicate operations, requiring great skill and careful treatment; and hence it has been somewhat difficult to produce uniformly perfect results, and a certain percentage of the goods are of second quality or have to be classed as "scrap" to be "run over" into cheaper grades of the product. The compound however made with dinitro-toluol in the presence of camphor can be thoroughly seasoned or dried without any impairment of its molding properties, the low melting-point and the non-volatile nature of the dinitro-toluol giving to the dry product the permanent quality of easy plasticity, as distinguished from the compound in which camphor alone is employed, from which the camphor is gradually evaporating. Consequently, compounds containing this combination solvent can be more readily molded at safe temperatures without the necessary presence of a residue of the alcoholic or other liquid solvent, thus rendering the manipulation of the compound more uniform and certain. The dinitro-toluol feature of the compound solvent also tends to render the dry material much less liable to warp or shrink or to loss of weight, which are very annoying features of the camphor-pyroxyline compounds.

In making the combinations with the solid compound solvent and pyroxyline I proceed as described or referred to in my original application, Serial No. 354,785, filed June 9, 1890, and already mentioned herein. There is this difference, however: The lower melting-point of the camphor-dinitro-toluol combination, as compared with dinitro-toluol alone, permits the employment of even lower temperatures than those given in application Serial No. 354,785 in the process involving the conversion, under heat and pressure, of the mixture of solid solvent and pyroxyline without the necessary presence of a liquid solvent, and as there is more or less danger or risk attendant upon the employment of this particular process I have made a great improvement by furnishing the art with a perfectly-hard, non-volatile combination which can be converted into a homogeneous solid at fairly-low temperatures. I cannot, therefore, too strongly insist upon the importance of the camphor-dinitro-toluol solvent in making a pyroxyline compound without the use of liquids. The operator in this art will readily appreciate this fact, as he has always performed this particular process with considerable trepidation and great caution. The operator, however, is cautioned, as referred to in the original application, Serial No. 354,785, to continue to use this particular process with great care.

In making references to the original application, Serial No. 354,785, I include all statements and descriptions in any other application or patent which are mentioned or referred to in the application Serial No. 354,785. I have done this in order to avoid unnecessarily repeating myself or prolonging this specification beyond reasonable limits.

As to the proportion of the dinitro-toluol-camphor solvent to be employed, I recommend about fifty parts of the combined solvent and one hundred parts of pyroxyline, intimately mixed together, for a compound which is to be converted without the use of alcoholic or other liquid solvent, but simply by the employment of heat and pressure. The lowest fusing-point will be secured by employing about equal parts of the dinitro-toluol and camphor—that is, in the last-mentioned proportions: twenty-five parts dinitro-toluol, twenty-five parts camphor, and one hundred parts pyroxyline. The proportion of the combined solvent can be increased or decreased, according to the latent plasticity desired in the final product. Where liquid solvents are to be employed in connection with the combined dinitro-toluol-camphor solvent, the solid solvent can be decreased in amount; say as low as twenty-five parts of the combined solvent to each one hundred parts of pyroxyline can be used, or less, if desired. Good proportions for this process are: one hundred parts pyroxyline, forty parts camphor, ten parts dinitro-toluol, and forty to forty-five parts alcohol or wood-alcohol.

Where the solid solvent consists largely of dinitro-toluol I prefer to use acetone as the liquid solvent, on account of the dinitro-toluol being easily soluble in acetone, as referred to in application Serial No. 354,785. Generally, however, the dinitro-toluol-camphor combination is sufficiently soluble in either ethylic or methylic alcohols, especially if the camphor is present to any considerable extent, to enable the use of such alcohols instead of the acetone.

The instructions as to the liquid solvents in application Serial No. 354,785 and the knowledge already possessed of the solvent powers of either the ethylic or the methylic alcohols on camphor will be sufficient for the operator without further description.

The solvent action of the camphor-dinitro-toluol mixture on the pyroxyline, even if the pyroxyline compound made with this solvent is in what is known as a "converted" state or condition, embodies the same principle as already described or referred to in application Serial No. 354,785, as involved in the employment of dinitro-toluol as the solid solvent; and I make the same claims in this application as to the solvent action of the dinitro-toluol-camphor combination as are made in application Serial No. 354,785 for dinitro-toluol.

The present compound contains the advantages derivable from the use of dinitro-toluol or camphor in proportion as those ingredients are present, with the additional advantage due to the lower plastic point of the camphor-dinitro-toluol mixture, as already described.

Although I prefer for the sake of economy to manufacture the present solid compound of camphor, dinitro-toluol, and pyroxyline by what is known as the "solid" or "massive" process, I wish it to be distinctly understood that the final hard, or massive, or solid compound can be produced even by the liquid method of conversion or by the employment of sufficiently large proportions of liquid solvent to make the compound flow without the use of heat or pressure. When the liquid is sufficiently evaporated from the compound the result is a stiff or hard mass or sheet containing pyroxyline, dinitro-toluol, and camphor, which, though made by a different process from that which I have recommended, and subject to the imperfections attending the use of the liquid process, is practically my invention.

As to the solvent action of the camphor-dinitro-toluol combination when heated, I wish it distinctly understood that even if pyroxyline is treated by the liquid mode of conversion, and the liquid is then evaporated and then dinitro-toluol and camphor be present in proportion such as to produce, after evaporation of the liquid solvents, what is substantially a compound of pyroxyline and dinitro-toluol and camphor, any heating or treatment of the resulting solid which will develop the latent solvent power of the dinitro-toluol and camphor so that it will soften, dissolve, or make plastic the pyroxyline, is a use of the solvent powers of the dinitro-toluol-camphor mixture, as already explained, and such operation is within the invention herein set forth.

I believe myself to be the first to discover the value of the use of dinitro-toluol, combined with camphor in the manufacture of pyroxyline compounds, both of the solid or massive form and of the fluid form.

The dinitro-toluol-pyroxyline liquid compound has been made by me the subject of a separate application for Letters Patent, (known as case D, Serial No. 354,787,) and for the reason stated in such application, and as referred to in application Serial No. 354,785, I claim herein broadly the use of dinitro-toluol and camphor, combined, as a solvent or converting agent in the manufacture of all forms of pyroxyline compounds capable of imitating natural substances, and this independent of the time at which the dinitro-toluol and camphor are introduced into such compounds, because dinitro-toluol and camphor may be used with advantage even if they are introduced after the original fibrous structure of the pyroxyline has been broken down by the use of other solvents or converting agents, and their presence in such compounds gives to them properties which they would not otherwise possess, and when I use the words "solvents" or "converting" agent in this specification it is with this understanding.

What I claim, and desire to secure by Letters Patent, is—

1. The process of manufacturing solid or massive pyroxyline compounds which consists in mixing pyroxyline, di-nitro-toluol and camphor, and subsequently subjecting the resulting compound to heat and pressure sufficient to render the compound plastic, substantially as described.

2. The process of manufacturing solid or massive pyroxyline compounds which consists in mixing pyroxyline, di-nitro-toluol and camphor and a liquid solvent, and subsequently subjecting the resulting compound to heat and pressure sufficient to render the compound plastic, substantially as described.

3. As a new composition of matter, a solid or massive pyroxyline compound containing pyroxyline, di-nitro-toluol and camphor, substantially as set forth.

4. As a new composition of matter, a solid or massive pyroxyline compound containing pyroxyline, di-nitro-toluol camphor and a liquid solvent, substantially as set forth.

In testimony whereof I affix my signature, in presence of two witnesses, this 6th day of December, 1893.

JOHN H. STEVENS.

Witnesses:
 JENNIE A. SMITH,
 FREDERIC ADAMS.